(12) United States Patent
Nakamura (10) Patent No.: US 8,830,422 B2
(45) Date of Patent: Sep. 9, 2014

(54) EDGE-LIGHT ILLUMINATING DEVICE, AND LIQUID CRYSTAL DISPLAY DEVICE

(75) Inventor: Ryuhei Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 149 days.

(21) Appl. No.: 13/575,065

(22) PCT Filed: Oct. 14, 2010

(86) PCT No.: PCT/JP2010/068036
§ 371 (c)(1),
(2), (4) Date: Jul. 25, 2012

(87) PCT Pub. No.: WO2011/092902
PCT Pub. Date: Aug. 4, 2011

(65) Prior Publication Data
US 2013/0002979 A1    Jan. 3, 2013

(30) Foreign Application Priority Data
Jan. 26, 2010 (JP) .................................. 2010-013853

(51) Int. Cl.
*G02F 1/1335* (2006.01)
*F21V 8/00* (2006.01)

(52) U.S. Cl.
CPC ............ *G02B 6/0055* (2013.01); *G02B 6/0068* (2013.01); *G02F 1/133603* (2013.01); *G02B 6/0073* (2013.01); *G02F 1/133605* (2013.01); *G02B 6/0085* (2013.01); *G02B 6/0088* (2013.01)
USPC .......................................................... 349/65

(58) Field of Classification Search
USPC .......................................................... 349/65
See application file for complete search history.

(56) References Cited

U.S. PATENT DOCUMENTS

2010/0165253 A1* 7/2010 Jung et al. ...................... 349/65
2011/0292316 A1* 12/2011 Fujimoto et al. ................ 349/58

FOREIGN PATENT DOCUMENTS

| JP | 2005-242270 A | 9/2005 |
| JP | 2006-201210 A | 8/2006 |
| JP | 2006-235436 A | 9/2006 |
| JP | 2008-198540 A | 8/2008 |

OTHER PUBLICATIONS

Official Communication issued in International Patent Application No. PCT/JP2010/068036, mailed on Dec. 14, 2010.

* cited by examiner

*Primary Examiner* — Phu Vu
(74) *Attorney, Agent, or Firm* — Keating & Bennett, LLP (57) ABSTRACT

Provided is an edge-light illuminating device in which a deformation is prevented from occurring in a reflection sheet due to thermal expansion of the reflection sheet. An edge-light illuminating device (3) of the present invention is arranged to illuminate a liquid crystal display panel (2) from a back side of the panel, and includes a light guide plate (7), a light source (5) that faces an edge face (72) of the plate and is arranged to project light onto the edge face, a case (4) arranged to house the plate and the light source, and a reflection sheet (6) laid on a bottom face (41) of the case and sandwiched between the bottom face and a back face (71) of the plate housed in the case, wherein the reflection sheet includes a slot portion (61) disposed along a direction that the reflection sheet expands by heat generated by the light source.

6 Claims, 8 Drawing Sheets

EDGE-LIGHT ILLUMINATING DEVICE, AND LIQUID CRYSTAL DISPLAY DEVICE

TECHNICAL FIELD

The present invention relates to an edge-light illuminating device, and a liquid crystal display device.

BACKGROUND ART

A transmissive liquid crystal display device, which includes a liquid crystal display panel on which images and text information are to be displayed, includes an illuminating device for projecting light onto a back face of the liquid crystal display panel (a so-called backlight). An edge-light illuminating device is well known as this kind of illuminating device, which includes a plate-shaped light guide plate made from a transparent material such as an acrylic resin, and a light source such as a cold cathode fluorescent tube and a light-emitting diode that is disposed along an edge face of the light guide plate (see PTL 1). A thin profile of the edge-light illuminating device having this configuration can be advantageously achieved more easily than illuminating devices of other types, and thus the edge-light illuminating devices are used favorably.

Among the edge-light illuminating devices, an edge-light illuminating device including a light-emitting diode as a light source has the advantages of a long life and a high luminous efficiency, which has been receiving widespread attention in recent years (see PTL 2).

The edge-light illuminating device includes a reflection sheet disposed on a back face of the light guide plate as disclosed in PTLs 1 and 2. The reflection sheet defines a resin foam sheet having the shape corresponding to the shape of the light guide plate, and is arranged to reflect to return light that leaks out of the back face of the light guide plate.

CITATION LIST

Patent Literature

PTL 1: JP2006-201210
PTL 2: JP2006-235436

SUMMARY OF INVENTION

Technical Problem

In the edge-light illuminating device, the light source is disposed on a side close to an edge of the reflection sheet as disclosed in PTLs 1 and 2. Thus, heat that is generated by emission of the light source is apt to be applied intensively to an edge portion of the reflection sheet, close to which the light source is disposed, so that the edge portion thermally expands to cause a deformation (wrinkle). The deformation in the reflection sheet causes a problem of luminance unevenness in the edge-light illuminating device.

An object of the present invention is to provide an edge-light illuminating device in which a deformation is prevented from occurring in a reflection sheet due to thermal expansion of the reflection sheet.

Solution to Problem

<1> An edge-light illuminating device for illuminating a liquid crystal display panel from a back side of the panel includes a light guide plate, a light source that faces an edge face of the light guide plate and is arranged to project light onto the edge face, a case arranged to house the light guide plate and the light source, and a reflection sheet that is laid on a bottom face of the case and sandwiched between the bottom face and a back face of the light guide plate housed in the case, wherein the reflection sheet includes at least one of a slot portion and an incision portion that is disposed along a direction that the reflection sheet expands by heat generated by the light source.

<2> The edge-light illuminating device according to <1>, wherein the at least one of the slot portion and the incision portion is perpendicular to an isothermal line that indicates distribution of the generated heat in the reflection sheet.

<3> The edge-light illuminating device according to <1> or <2>, wherein the at least one of the slot portion and the incision portion has a width that becomes larger as the at least one of the slot portion and the incision portion is closer to the light source.

<4> The edge-light illuminating device according to any one of <1> to <3>, wherein the at least one of the slot portion and the incision portion is disposed in a radial pattern.

<5> The edge-light illuminating device according to any one of <1> to <4>, wherein the case includes a protrusion on the bottom face, the protrusion is inserted into the slot portion, and the reflection sheet is fixed with the use of the protrusion.

<6> The edge-light illuminating device according to any one of <1> to <5>, wherein the light source defines a light-emitting diode.

<7> A liquid crystal display device including the edge-light illuminating device according to any one of <1> to <6>.

Advantageous Effects of Invention

The edge-light illuminating device of preferred embodiments of the present invention has the configuration such that a deformation is prevented from occurring in the reflection sheet due to thermal expansion of the reflection sheet.

DESCRIPTION OF EMBODIMENTS

Detailed descriptions of an edge-light illuminating device and a liquid crystal display device of preferred embodiments of the present invention will now be provided with reference to the accompanying drawings. It is to be noted that the present invention is not limited to the preferred embodiments described in the present specification.

[First Embodiment]

Figure 1:
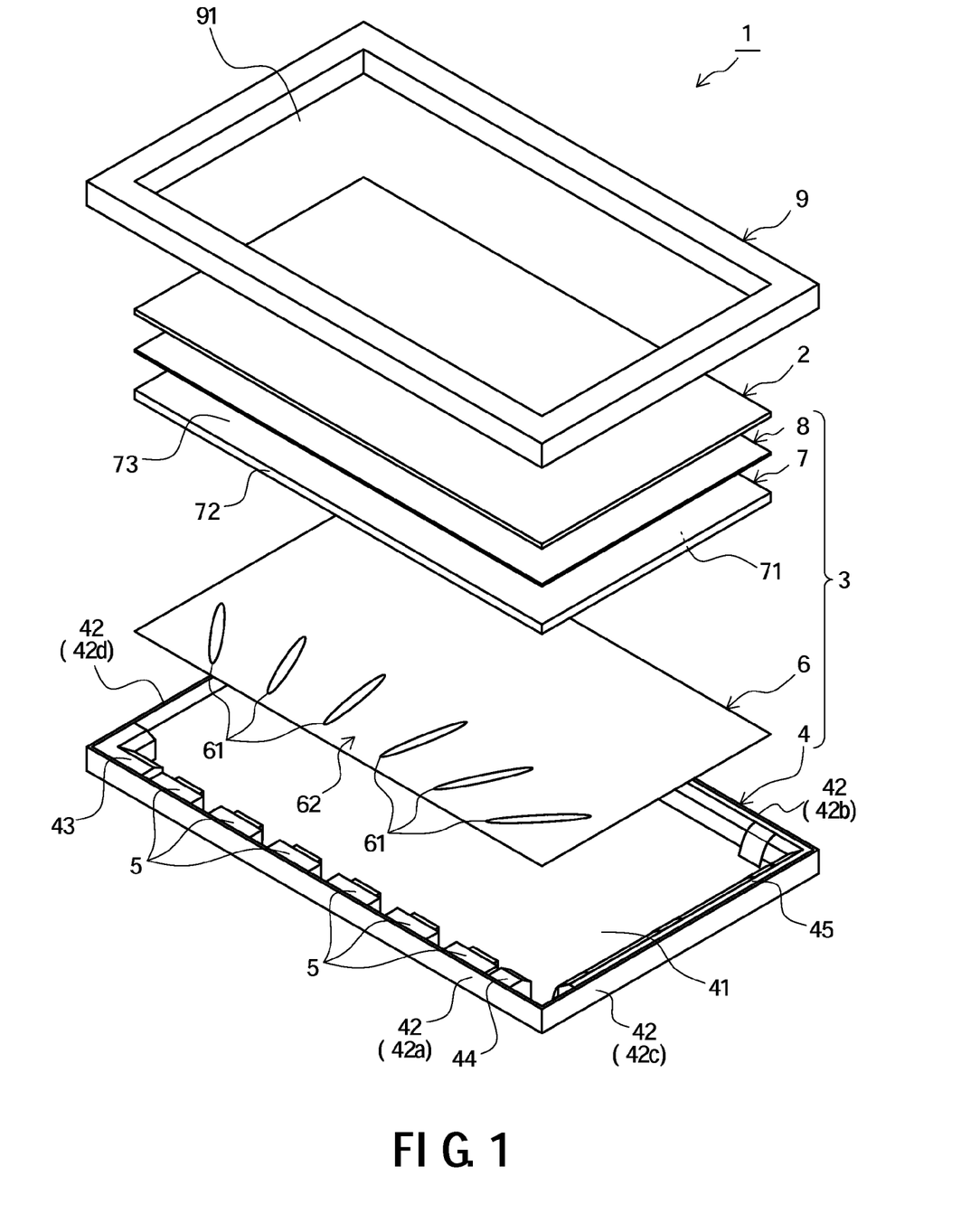
FIG. 1 is an exploded perspective view showing a schematic configuration of a liquid crystal display device of one preferred embodiment of the present invention.

FIG. 1 is an exploded perspective view showing a schematic configuration of a liquid crystal display device of a first embodiment of the present invention. A liquid crystal display device 1 includes a liquid crystal display panel 2 that defines a flat-screen display element, an edge-light illuminating device 3 arranged to project planar light onto a back face of the liquid crystal display panel 2, and a frame 9 as shown in FIG. 1.

The liquid crystal display panel 2 is of an active matrix drive type, and includes a pair of transparent substrates (not shown) that are opposed to each other, and a liquid crystal layer (not shown) that is sandwiched between the substrates. The substrates define a thin film transistor (TFT) substrate and a color filter (CF) substrate. The TFT substrate includes TFTs that define switching elements and pixel electrodes that are arranged in a matrix on the transparent glass substrate. The CF substrate includes a CF layer of a plurality of colors and a common electrode that are layered in sequence on the transparent glass substrate. Polarizing plates (not shown) and optical films (not shown) are each layered on the substrates.

The liquid crystal display panel 2 includes a source driver (not shown) and a gate driver (not shown) that are arranged to drive the liquid crystal display panel 2. The driving of the liquid crystal display panel adjusts a transmission amount of the light projected from the edge-light illuminating device 3, and an image is displayed on the liquid crystal display panel 2 with the use of the adjusted light.

The edge-light illuminating device 3 is arranged to project the light that is planarly diffused onto the back face of the liquid crystal display panel 2. The edge-light illuminating device 3 includes a case 4, light sources 5, a reflection sheet 6, a light guide plate 7, and an optical sheet 8 as shown in FIG. 1.

The case 4 defines a container of low height that is arranged to house the light sources 5, the reflection sheet 6, the light guide plate 7 and other constituent elements, and is made from a metal material such as aluminum, or a resin material. In the present embodiment, the case 4 is made from aluminum. The case 4 mainly consists of a bottom face 41, outer walls 42 that surround the bottom face 41 as shown in FIG. 1. The bottom face 41 has a rectangular shape. The light sources 5 are aligned at regular intervals along the inside of the outer wall 42 (42a) that is one of the paired outer walls 42 (42a and 42b) in a longitudinal direction that are opposed to each other sandwiching the bottom face 41.

The light sources 5 preferably define known light-emitting diodes (LEDs) that show white color, and are disposed on a printed-circuit board (not shown). The printed-circuit board on which the light sources (LEDs) 5 are disposed (i.e., the LED substrate) is fixed to the outer wall 42 of the case 4 with the use of a screw, for example. The LEDs 5 are electrically connected to one another in series and are turned on by PWM (Pulse Width Modulation) control.

The reflection sheet 6 is laid on the bottom face 41 of the case 4. Then, the light guide plate 7 and the optical sheet 8 are layered in this order on the reflection sheet 6.

The light guide plate 7 defines a transparent plate having a rectangular shape. A conventional light guide plate is used as the light guide plate 7. The light guide plate 7 preferably defines an acrylic resin plate. The light guide plate 7 includes a plurality of scattering members (not shown) in a dot pattern over a back face 71 thereof. The scattering members are preferably provided thereon by dotting paint containing a white pigment in a printing method on the back face 71 of the light guide plate 7.

The light guide plate 7 is housed in the case 4 such that an edge face 72 of the light guide plate 7 faces the light sources 5. The light guide plate 7 is positioned by a variety of positioning members 43, 44 and 45 that are provided inside the case 4, and held inside of the case 4. The light guide plate 7 that is positioned inside the case 4 is arranged to hold the reflection sheet 6 while sandwiching it between the back face 71 and the bottom face 41 of the case 4.

When the light from the light sources 5 enters from the edge face 72 of the light guide plate 7, the light is guided into the light guide plate 7 to be diffused inside the light guide plate 7, and is emitted from a surface 73 of the light guide plate 7.

The optical sheet 8 layered on the surface 73 of the light guide plate 7 defines a conventional diffusion or prism sheet. The optical sheet 8 may have a single-layer configuration or a multi-layer configuration. The liquid crystal display panel 2 is layered on the optical sheet 8 such that the back face of the liquid crystal display panel 2 faces the optical sheet 8.

The layered constituent elements of the reflection sheet 6, the light guide plate 7, the optical sheet 8 and the liquid crystal display panel 2 are held by the frame 9 inside the case 4. The frame 9 is made from metal or resin, and includes an opening 91 from which a display portion of the liquid crystal display panel 2 is exposed. The frame 9 is fixed to the outer walls 42 by fixing means (not shown) so as to cover edge portions of the liquid crystal display panel 2 that is disposed on the top level of the layered constituent elements.

The reflection sheet 6 is arranged to reflect to return the light that leaks (emits) out of the back face 71 of the light guide plate 7. A material that is conventionally used for a reflection sheet is used for the reflection sheet 6. For example, a resin such as polyethylene terephthalate (PET) that is expanded and formed into a sheet shape (e.g., an expanded PET sheet) is preferably used for the reflection sheet 6. The thickness of the reflection sheet 6 is not limited specifically, and is determined depending on the intended use within a range of not impairing the above-described function.

The size of the reflection sheet 6 is determined so as to be housed in the case 4 and cover the back face 71 of the light guide plate 7. The reflection sheet 6 has a rectangular shape similar to the rectangular shape of the light guide plate 7 so that the shape of the reflection sheet 6 may correspond to the shape of the light guide plate 7.

The reflection sheet 6 includes a plurality of slot portions 61. The slot portions 61 are disposed at an edge portion 62 of the reflection sheet 6, where the edge portion 62 is close to the light sources (5). The slot portions 61 are formed by cutting them out from a rectangular sheet that defines a base material for the reflection sheet 6. The slot portions 61 have the shape of an elongated ellipse as shown in FIG. 1, and are disposed such that their long axes are along thermal expansion directions of the reflection sheet 6. In the present specification, the thermal expansion directions of the reflection sheet 6 are determined based on directions of temperature gradient that occurs in the reflection sheet 6 by heat from the light source 5.

Figure 2:
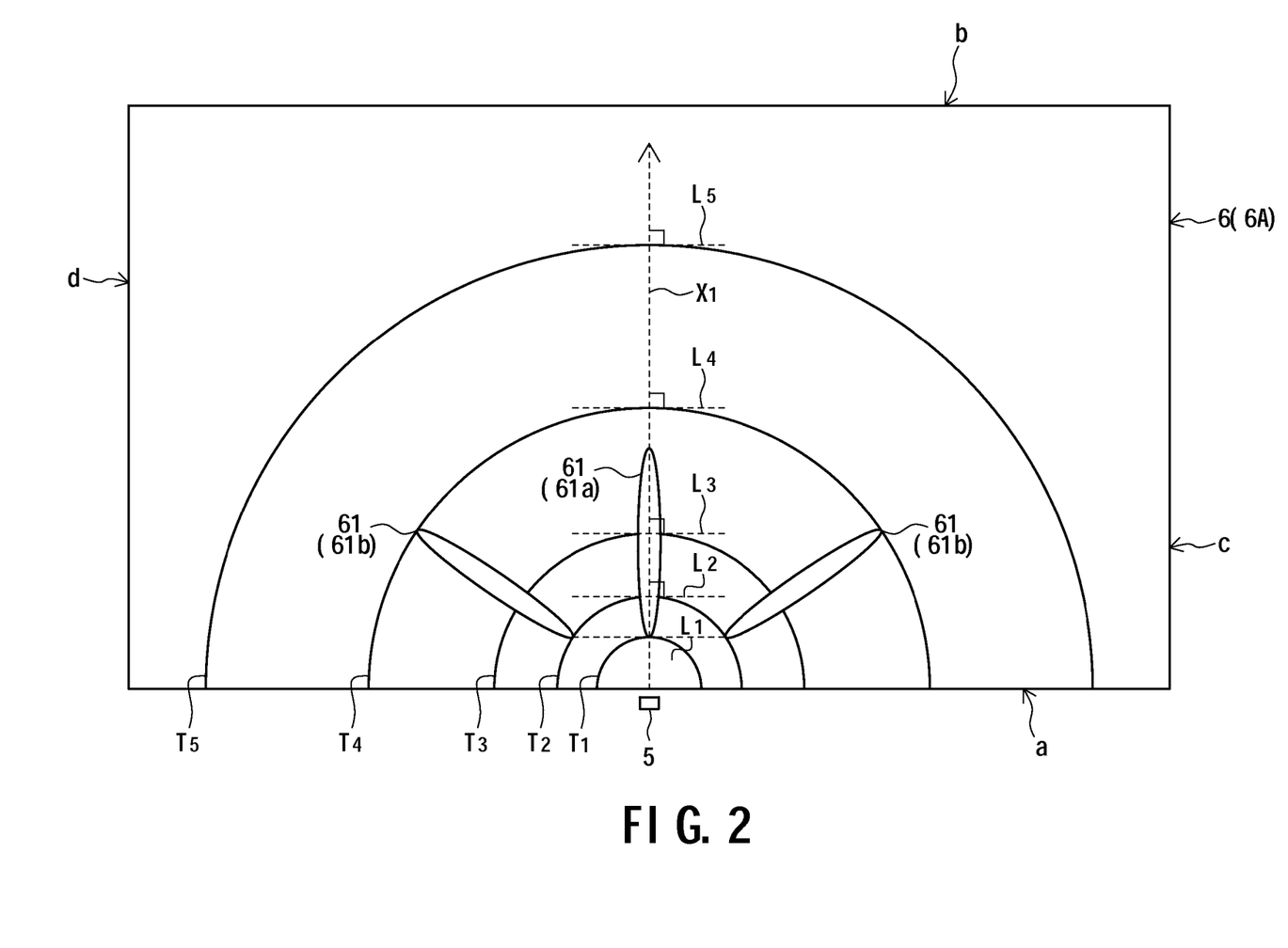
FIG. 2 is an explanatory view schematically showing distribution of heat generated in the reflection sheet, which is indicated with isothermal lines, where one light source is used.
Figure 3:
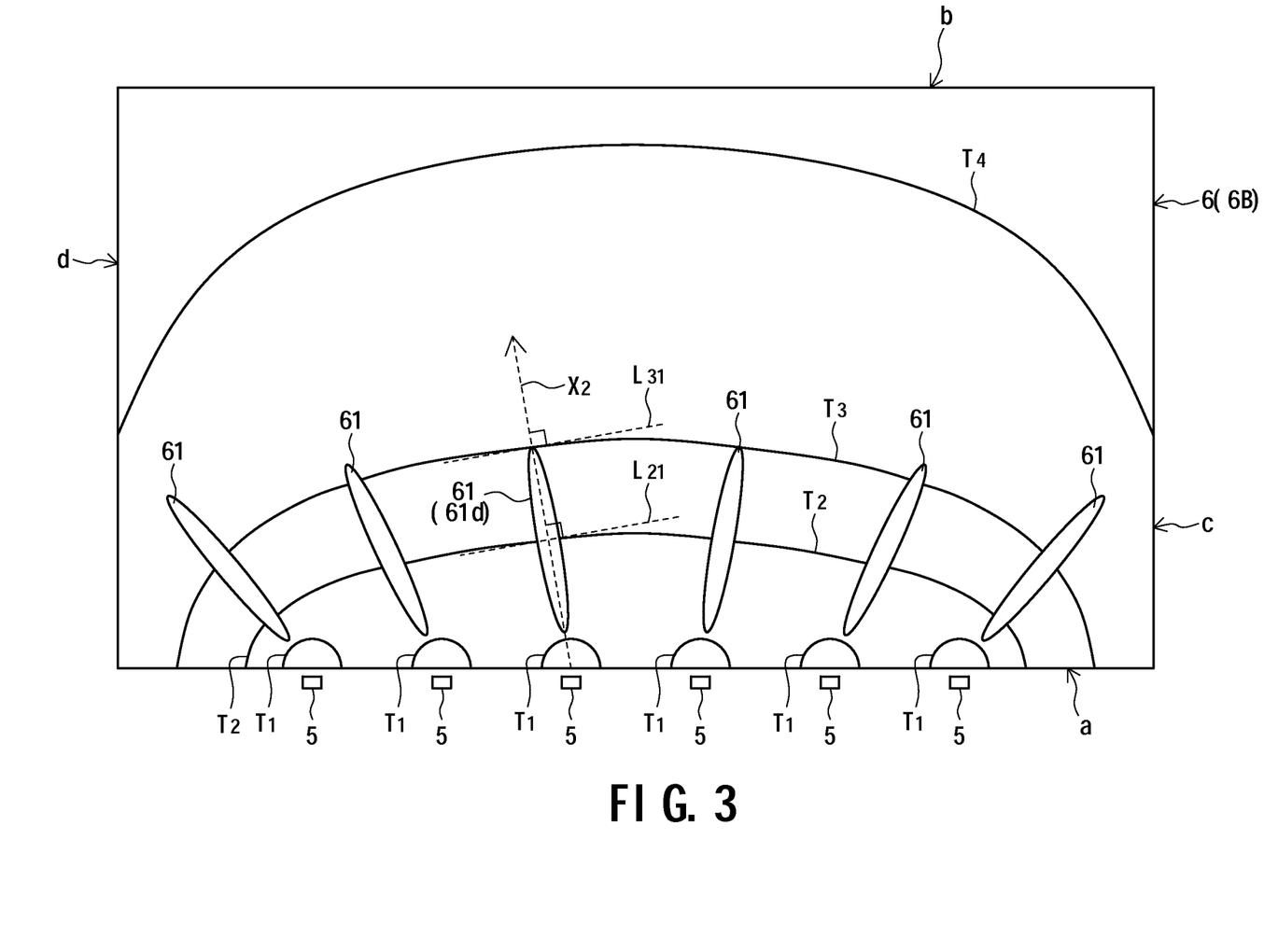
FIG. 3 is an explanatory view schematically showing distribution of heat generated in the reflection sheet, which is indicated with isothermal lines, where six light sources are used.

A description of a method for determining the thermal expansion direction of the reflection sheet 6 will be provided with reference to FIGS. 2 and 3. FIG. 2 is an explanatory view schematically showing distribution of heat generated in the reflection sheet 6, which is indicated with isothermal lines, where the one light source 5 is used. FIG. 3 is an explanatory view schematically showing distribution of heat generated in the reflection sheet 6, which is indicated with isothermal lines, where the plurality of (six) light sources 5 are used.

Shown in FIG. 2 is a plan view showing a reflection sheet 6 (6A) that has a rectangular shape having four sides a, b, c and d, where the one light source (LED) 5 is disposed close to the side a of the reflection sheet 6 (6A). The one light source (LED) 5 is disposed close to the center portion of the side a of the reflection sheet 6 (6A). In this case, when the light source 5 is turned on, heat is generated therefrom and moves so as to concentrically (radially) spread from the center portion of the side a of the reflection sheet 6 (6A) toward the center of the reflection sheet 6 (6A). The distribution of heat in the reflection sheet 6 (6A) is schematically indicated with the isothermal lines T1 to T5 in FIG. 2. The isothermal line T1 indicates the highest temperature among the isothermal lines T1 to T5. Portions of the reflection sheet 6 (6A) that become gradually lower by a given temperature than the isothermal line T1 are indicated with the isothermal lines T2 to T5. The temperature of the reflection sheet 6 (6A) is higher as the portions of the reflection sheet 6 (6A) are closer to the light source 5 as shown in FIG. 2. Information on the distribution of heat and isothermal lines of the reflection sheet 6 (6A) is obtained using the base material for the reflection sheet 6 (6A) that has no slot portions 61. The information can be obtained easily using known thermography.

The direction of temperature gradient in the reflection sheet 6 (6A) is obtained as a direction perpendicular to the isothermal lines T1 to T5. There exists one or more directions of temperature gradient in the one reflection sheet 6 (6A). One direction of temperature gradient is indicated with the dashed line arrow X1 in FIG. 2. The direction of temperature gradient indicated with the dashed line arrow X1 is perpendicular (substantially perpendicular) to the tangent lines L1 to L5 that are tangent to the isothermal lines T1 to T5. The direction of temperature gradient indicated with the dashed line arrow X1 defines the thermal expansion direction of the reflection sheet 6 (6A).

The slot portion 61 (61*a*) is disposed along the direction of the dashed line arrow X1 in the reflection sheet 6 (6A). The long axis of the slot portion 61 (61*a*) having the shape of the elongated ellipse is disposed along the direction of temperature gradient indicated with the dashed line arrow X1 (thermal expansion direction). The other slot portions 61 (61*b* and 61*c*) of the reflection sheet 6 (6A) shown in FIG. 2 are disposed along the corresponding directions of the temperature gradient (not shown). These slot portions 61 (61*a*, 61*b* and 61*c*) are almost same in size, and disposed radially in the reflection sheet 6 (6A).

Shown in FIG. 3 is a plan view showing a reflection sheet 6 (6B) that has a rectangular shape having four sides a, b, c and d, where the plurality of (six) light sources (LEDs) 5 are disposed close to the side a of the reflection sheet 6 (6B). These light sources (LEDs) 5 are aligned at regular intervals along the side a of the reflection sheet 6 (6A). In this case, when the light sources 5 are turned on, heat is generated therefrom and moves so as to spread concentrically (radially) from the edge portion on the side a of the reflection sheet 6 (6B) toward the center of the reflection sheet 6 (6B). The distribution of heat in the reflection sheet 6 (6B) is schematically indicated with the isothermal lines T1 to T4 in FIG. 3. The isothermal line T1 indicates the highest temperature among the isothermal lines T1 to T4. Portions of the reflection sheet 6 (6B) that become gradually lower by a given temperature than the isothermal line T1 are indicated with the isothermal lines T2 to T4. The temperature of the reflection sheet 6 (6B) is higher as the portions of the reflection sheet 6 (6B) are closer to the light sources 5 as shown in FIG. 3. Information on the distribution of heat and isothermal lines of the reflection sheet 6 (6B) shown in FIG. 3 is obtained using the base material for the reflection sheet 6 (6B) that has no slot portions 61. The information can be obtained easily using known thermography.

The direction of temperature gradient in the reflection sheet 6 (6B) is determined based on the isothermal lines T1 to T4. When the direction of temperature gradient in the reflection sheet 6 (6B) is determined, the isothermal lines T2 and T3 are used among the isothermal lines T1 to T4. The direction of temperature gradient in the reflection sheet 6 (6B) is obtained as a direction perpendicular to the isothermal lines T2 and T3. There exists one or more directions of temperature gradient in the one reflection sheet 6 (6B). One direction of temperature gradient is indicated with the dashed line arrow X2 in FIG. 3. The direction of temperature gradient indicated with the dashed line arrow X2 is perpendicular to the tangent lines L21 and L31 that are tangent to the isothermal lines T2 and T3. The direction of temperature gradient indicated with the dashed line arrow X2 defines the thermal expansion direction of the reflection sheet 6 (6B).

The elongated-ellipse-shaped slot portion 61 (61*d*) is disposed along the direction of the dashed line arrow X2 in the reflection sheet 6 (6B). The other five slot portions 61 of the reflection sheet 6 (6B) shown in FIG. 3 are disposed along the corresponding directions of the temperature gradient (not shown).

The slot portions 61 of the reflection sheet 6 shown in FIG. 1 are provided using the method for determining the thermal expansion direction shown in FIG. 3.

It is preferable to dispose the slot portions 61 at portions of the reflection sheet 6 that are high in temperature (i.e., portions that are close to the light sources 5). The slot portions 61 are mainly arranged to absorb the thermal expansion of the reflection sheet 6. Disposing the slot portions 61 along the thermal expansion directions of the reflection sheet 6 as shown in FIGS. 1 to 3 can effectively prevent a deformation from occurring in the reflection sheet 6.

The number of the slot portions 61 provided to the one reflection sheet 6 is not limited specifically, and is determined as appropriate depending on the intended use within a range of not impairing the function of the reflection sheet 6. The size of the slot portions 61 is not limited specifically, and is determined as appropriate depending on the intended use within a range of not impairing the function of the reflection sheet 6. The shape of the slot portions 61 is not limited to the elongated ellipse shape shown in FIGS. 1 to 3, and may be a triangle shape of which the width increases more as the slot portions 61 get closer to the light sources. Thus, it is also preferable to increase the width of the slot portions as the slot portions get closer to the light sources (i.e. heat sources) so that the thermal expansion of the reflection sheet 6 is easily absorbed.

Next, detailed descriptions of liquid crystal display devices (edge-light illuminating devices) of preferred embodiments of the present invention will be provided with reference to the FIGS. 4 to 8. Explanations of constituent elements of the liquid crystal display devices of the present embodiments, which are common to the corresponding constituent elements of the above-described liquid crystal display device 1, are omitted, providing reference numerals same as the corresponding constituent elements of the liquid crystal display device 1.

[Second Embodiment]

Figure 4:
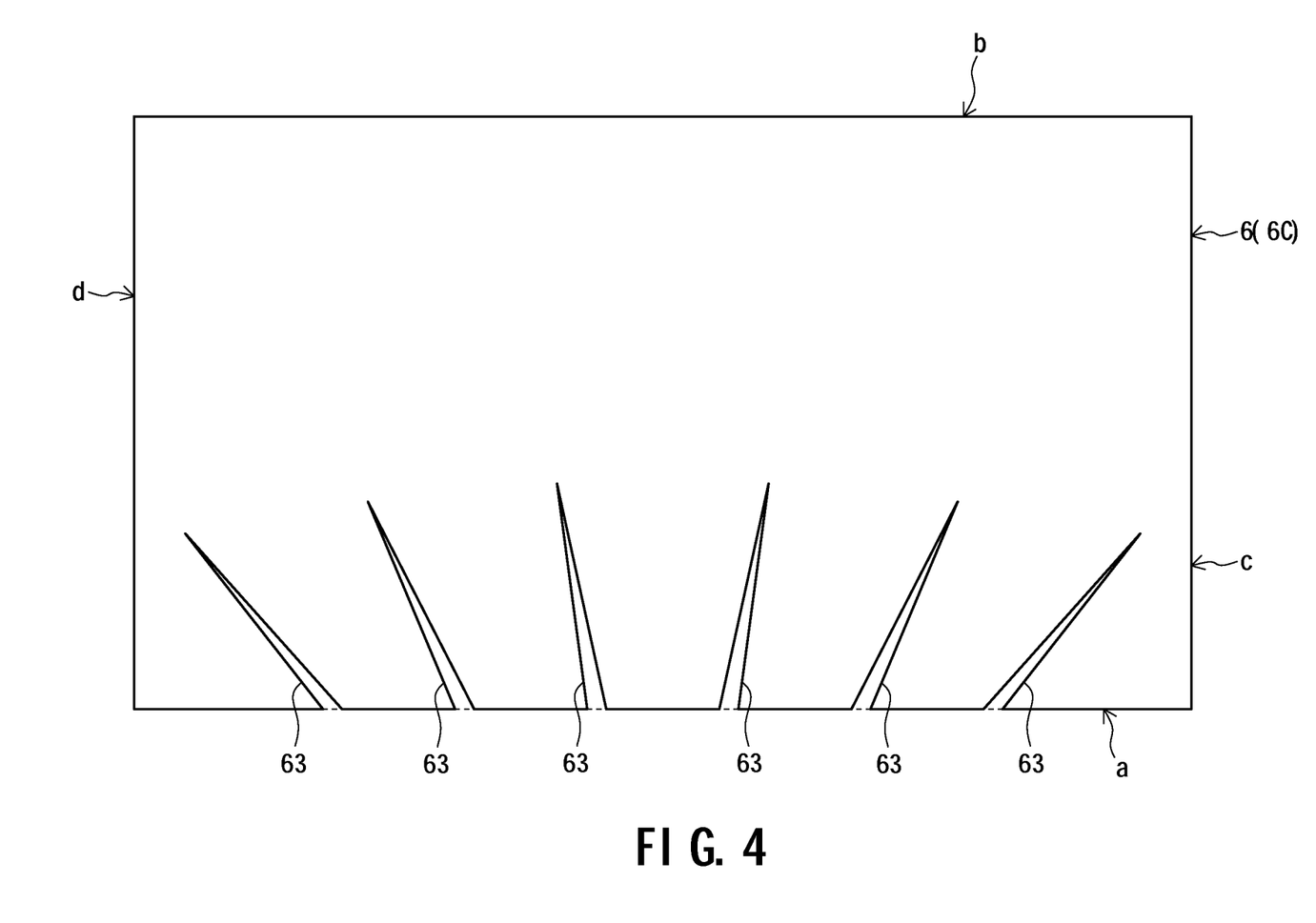
FIG. 4 is an explanatory view showing a schematic configuration of a reflection sheet used in a liquid crystal display device of another preferred embodiment of the present invention.

FIG. 4 is an explanatory view (plan view) showing a schematic configuration of a reflection sheet 6 (6C) used in the liquid crystal display device of another preferred embodiment of the present invention. The reflection sheet 6 (6C) replaces the reflection sheet 6 in the liquid crystal display device 1 (the edge-light illuminating device 3) shown in FIG. 1. The reflection sheet 6 (6C) has a rectangular shape having four sides a, b, c and d, and includes a plurality of incision portions 63 on the side a as shown in FIG. 4. To be specific, the incision portions 63 of the reflection sheet 6 (6C) replace the slot portions 61 of the reflection sheet 6 shown in FIG. 1. The incision portions 63 are arrange to mainly absorb the thermal expansion of the reflection sheet 6 (6C), which is the same function as the slot portions 61 shown in FIG. 1. The incision portions 63 are disposed on the side a (edge portion) of the reflection sheet 6 (6C), where the side a is close to the light sources. The incision portions 63 are oriented toward the center from the edge portion on the side a of the reflection sheet 6 (6C). The incision portions 63 have a triangle shape of which the width increases more as they get closer to the light sources so as to have a larger amount of absorbing the thermal expansion of the reflection sheet 6 (6C). The incision portions 63 are disposed radially in the reflection sheet 6 (6C).

Similarly to the directions of the slot portions 61 of the reflection sheet 6 shown in FIG. 1, the directions of the incision portions 63 (i.e., the directions that the edges of the triangle-shaped incision portions 63 head) are along the thermal expansion directions of the reflection sheet 6 (6C). The thermal expansion directions of the reflection sheet 6 (6C) are determined based on directions of temperature gradient that occurs in the reflection sheet 6 (6C), similarly to the reflection sheet 6 (6B) shown in FIG. 3.

Parameters such as number and size of the incision portions 63 provided to the one reflection sheet 6 are not limited specifically, and are determined as appropriate depending on the intended use within a range of not impairing the function of the reflection sheet 6.

Disposing the incision portions 63 on the side a (edge portion) of the reflection sheet 6 (6C), where the side a is close to the light sources, as shown in FIG. 4 can prevent a deformation from occurring due to thermal expansion of the reflection sheet 6 (6C).

[Third Embodiment]

Figure 5:
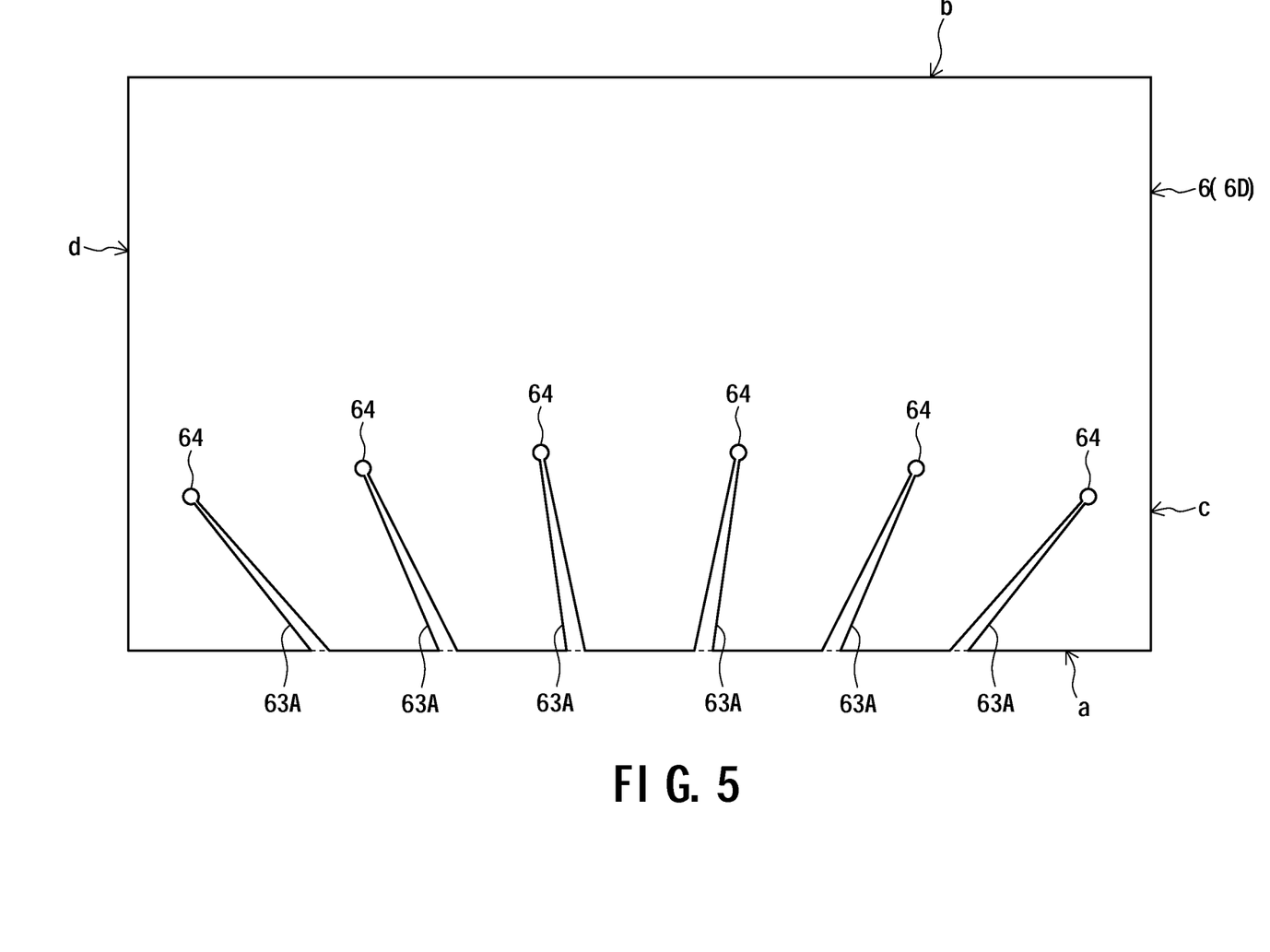
FIG. 5 is an explanatory view showing a schematic configuration of a reflection sheet used in a liquid crystal display device of another preferred embodiment of the present invention.

FIG. 5 is an explanatory view (plan view) showing a schematic configuration of a reflection sheet 6 (6D) used in the liquid crystal display device of another preferred embodiment of the present invention. The reflection sheet 6 (6D) includes incision portions 63A, which have a triangle shape similar to the shape of the incision portions 63, where round holes 64 are provided at the edges of the triangle-shaped incision portions 63A. Thus, it is also preferable to provide the round holes 64 at the edges of the triangle-shaped incision portions 63A so that the thermal expansion of the reflection sheet 6 (6D) is easily absorbed.

Disposing the incision portions 63A as shown in FIG. 5 can prevent a deformation from occurring due to thermal expansion of the reflection sheet 6 (6D).

[Fourth Embodiment]

Figure 6:
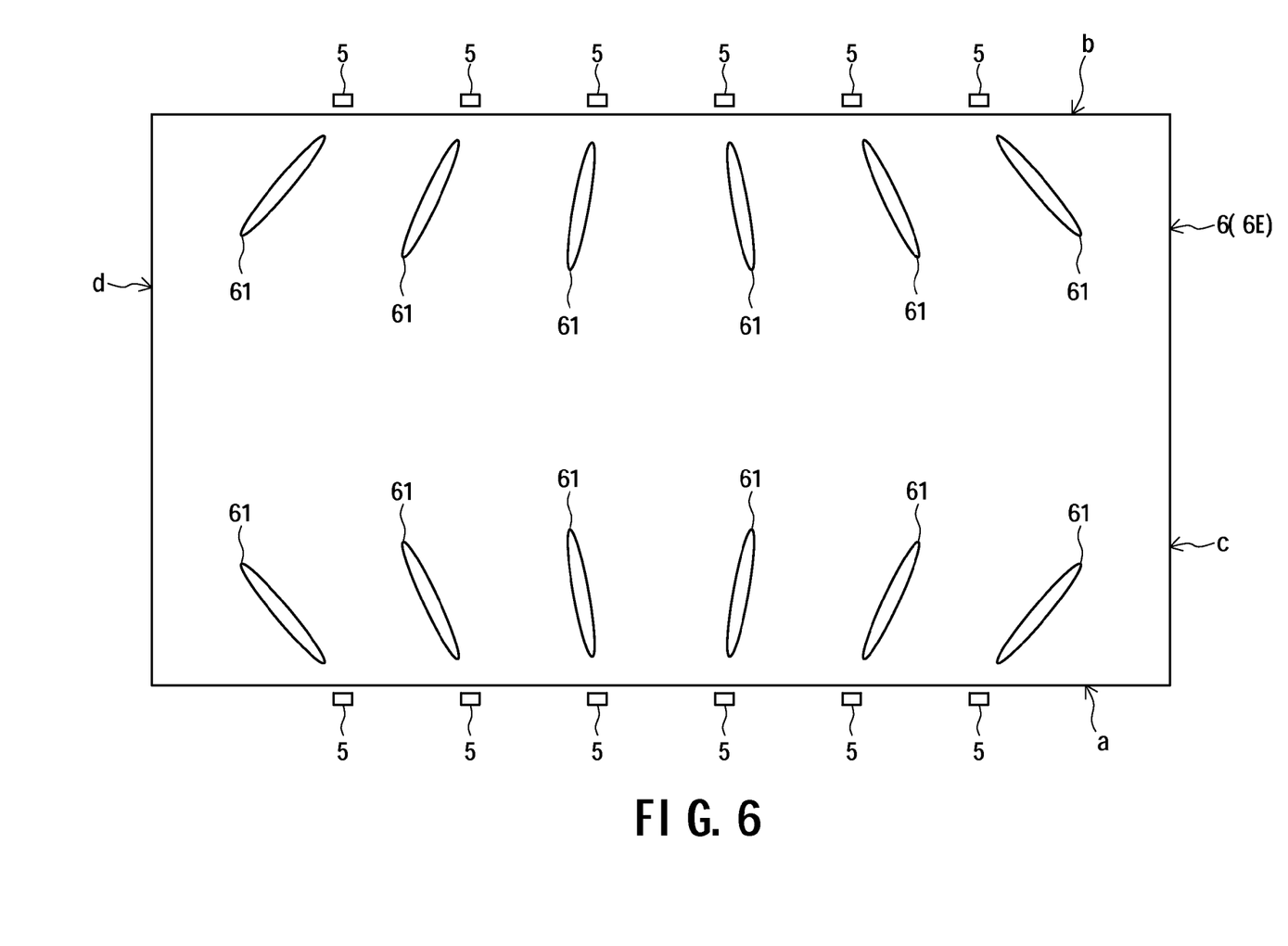
FIG. 6 is an explanatory view showing a schematic configuration of a reflection sheet used in a liquid crystal display device of another preferred embodiment of the present invention.

FIG. 6 is an explanatory view (plan view) showing a schematic configuration of a reflection sheet 6 (6E) used in the liquid crystal display device of another preferred embodiment of the present invention. The reflection sheet 6 (6E) is used in the liquid crystal display device (the edge-light illuminating device) including light sources 5 that are disposed at positions different from the liquid crystal display device 1 (the edge-light illuminating device 3) shown in FIG. 1. The reflection sheet 6 (6E) has a rectangular shape having four sides a, b, c and d, and the plurality of light sources 5 are aligned along the opposed sides a and b as shown in FIG. 6.

In the present embodiment, the heat generated from the light sources 5 moves so as to spread from the edge portions on the sides a and b of the reflection sheet 6 (6E) toward the center of the reflection sheet 6 (6E). Thus, the slot portions 61 can be provided close to the opposed sides a and b along the thermal expansion directions (directions of the temperature gradient) of the reflection sheet 6 (6E) even when the light sources 5 are disposed close to the opposed sides a and b. It is also preferable that the slot portions 61 are replaced with incision portions shown in FIG. 4.

[Fifth Embodiment]

Figure 7:
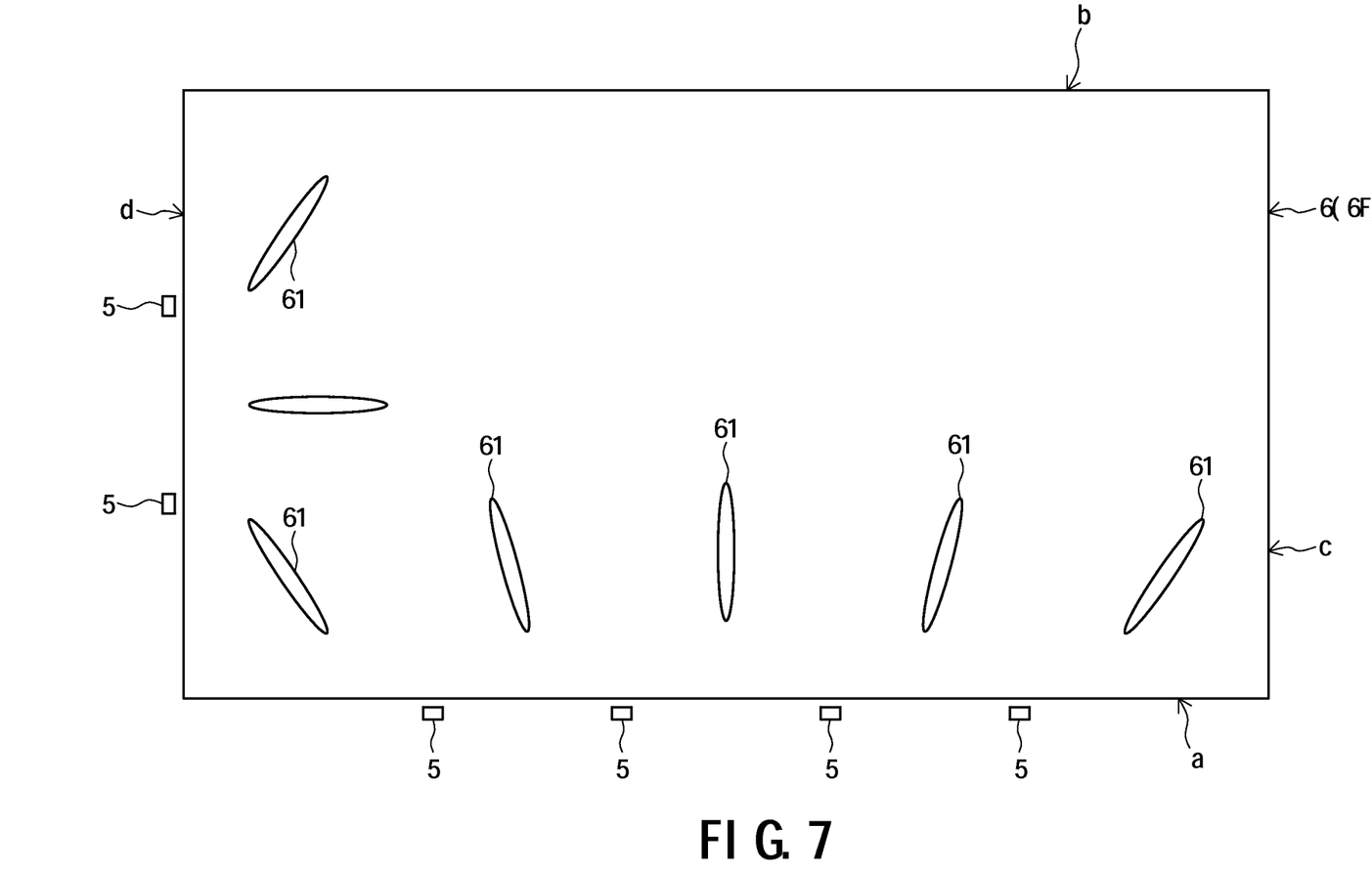
FIG. 7 is an explanatory view showing a schematic configuration of a reflection sheet used in a liquid crystal display device of another preferred embodiment of the present invention.

FIG. 7 is an explanatory view (plan view) showing a schematic configuration of a reflection sheet 6 (6F) used in the liquid crystal display device of another preferred embodiment of the present invention. The reflection sheet 6 (6F) is used in the liquid crystal display device (the edge-light illuminating device) including light sources 5 that are disposed at positions different from the liquid crystal display device 1 (the edge-light illuminating device 3) shown in FIG. 1. The reflection sheet 6 (6F) has a rectangular shape having four sides a, b, c and d, and the plurality of light sources 5 are aligned along the adjacent sides a and d as shown in FIG. 7.

In the present embodiment, the heat generated from the light sources 5 moves so as to spread from the edge portions on the sides a and d of the reflection sheet 6 (6F) toward the center of the reflection sheet 6 (6F). Thus, the slot portions 61 can be provided close to the opposed sides a and d along the thermal expansion directions (directions of the temperature gradient) of the reflection sheet 6 (6F) even when the light sources 5 are disposed close to the opposed sides a and d. It is also preferable that the slot portions 61 are replaced with incision portions shown in FIG. 4.

[Sixth Embodiment]

Figure 8:
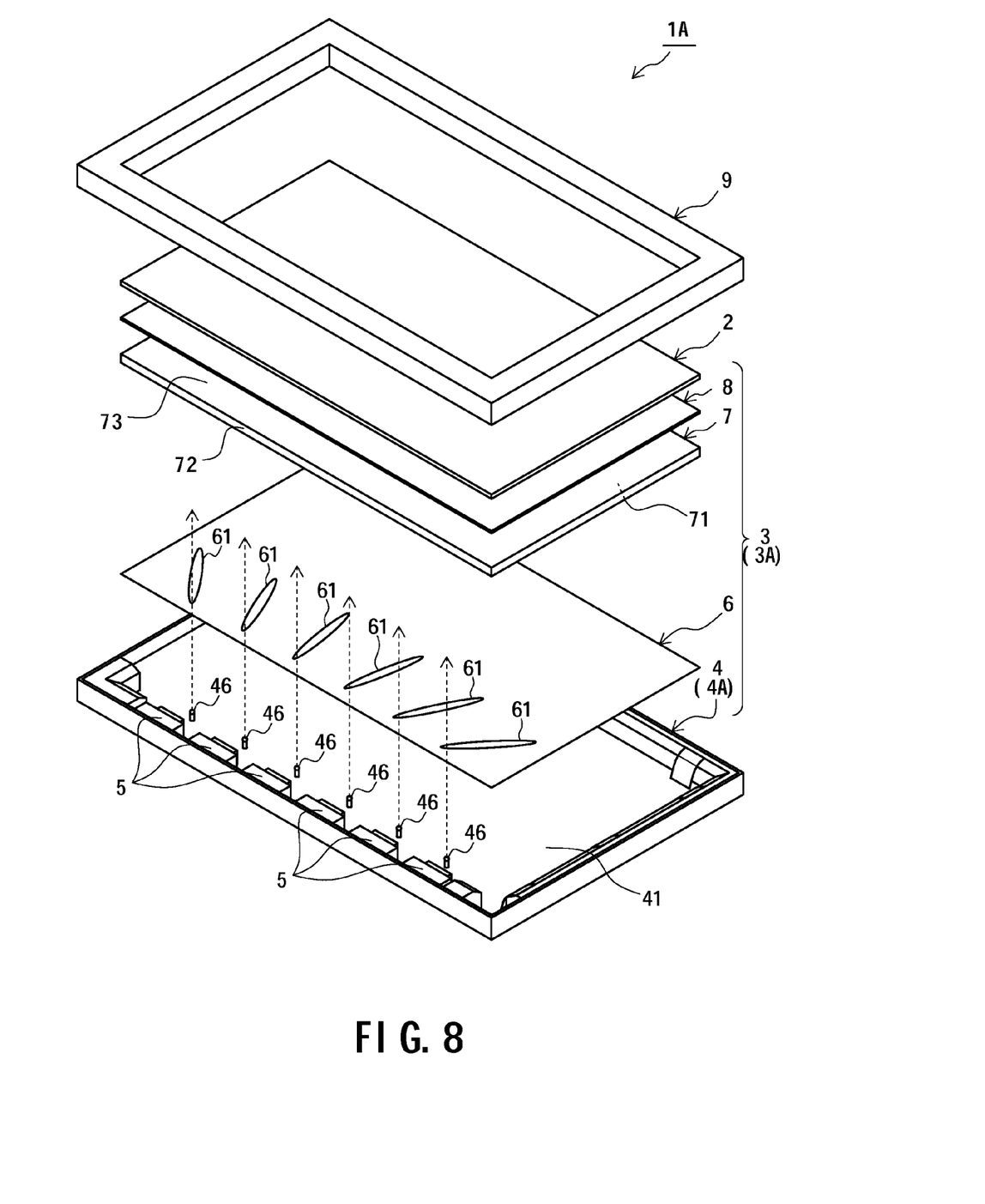
FIG. 8 is an exploded perspective view showing a schematic configuration of a liquid crystal display device of another preferred embodiment of the present invention.

FIG. 8 is an exploded perspective view showing a schematic configuration of a liquid crystal display device 1A of another preferred embodiment of the present invention. The liquid crystal display device 1A includes an edge-light illuminating device 3 (3A) that is different from the one the liquid crystal display device 1 shown in FIG. 1 includes. In the edge-light illuminating device 3 (3A), a case 4 (4A) includes a plurality of protrusions 46 for positioning the reflection sheet 6 on a bottom face 41 of the case 4 (4A). The protrusions 46 are made from a material same as the case 4, and preferably define pins made from aluminum. The protrusions 46 are inserted into the slot portions 61 provided to the reflection sheet 6. The height of the protrusions 6 is determined appropriately considering the position of the light guide plate 7 placed on the reflection sheet 6 (the height from the bottom face 41). Because the basic configuration of the liquid crystal display device 1A is same as that of the liquid crystal display device 1 shown in FIG. 1, explanations of constituent elements of the liquid crystal display device 1A, which are common to the corresponding constituent elements of the liquid crystal display device 1, are omitted, providing reference numerals same as the corresponding constituent elements of the liquid crystal display device 1.

The reflection sheet 6 of the edge-light illuminating device 3 (3A) is sandwiched between the bottom face 41 of the case 4 (4A) and the back face 71 of the light guide plate 7 and fixed therein. Then, the protrusions 46 are inserted into the slot portions 61, whereby the location of the reflection sheet 6 is identified. It is also preferable to use the slot portions 61 as holes for positioning the reflection sheet 6 as described above. Using the slot portions 61 disposed along the thermal expansion directions of the reflection sheet 6 as the holes for positioning the reflection sheet 6 allows the reflection sheet 6 not to collide with the protrusions 46 even when the reflection sheet 6 expands thermally, which can prevent a deformation from easily occurring in the reflection sheet 6. To be specific, even if the reflection sheet 6 has a coefficient of thermal expansion different from the case 4 (4A) (protrusions 46), a deformation can be prevented from easily occurring due to thermal expansion of the reflection sheet 6.

In the edge-light illuminating device of the present invention, if a cold cathode fluorescent tube is used as the light source, it is also preferable that slot portions and/or incision portions are provided along the thermal expansion directions of the reflection sheet, similarly to the case where the light-emitting diode is used.

In the edge-light illuminating device of the present invention, it is also preferable that the reflection sheet includes both slot portions and incision portions.

The invention claimed is:

1. An edge-light illuminating device for illuminating a liquid crystal display panel from a back side of the panel, the device comprising:
   a light guide plate;
   a light source that faces an edge face of the light guide plate, and is arranged to project light onto the edge face;
   a case arranged to house the light guide plate and the light source; and
   a reflection sheet that is laid on a bottom face of the case, and sandwiched between the bottom face and a back face of the light guide plate housed in the case, wherein
   the reflection sheet comprises a plurality of slot portions or incision portions that is disposed along a direction that the reflection sheet expands by heat generated by the light source;
   the plurality of slot portions or incision portions is disposed along a side of the reflection sheet; and
   the plurality of slot portions or incision portions is disposed in a radial pattern.

2. The edge-light illuminating device according to claim 1, wherein the plurality of slot portions or incision portions is perpendicular to an isothermal line that indicates distribution of the heat generated in the reflection sheet.

3. The edge-light illuminating device according to claim 1, wherein the plurality of slot portions or incision portions has a width that becomes larger as the at least one of the slot portion and the incision portion is closer to the light source.

4. The edge-light illuminating device according to claim 1, wherein the case comprises a protrusion on the bottom face, the protrusion is inserted into one of the plurality of slot portions or incision portions, and the reflection sheet is fixed with the use of the protrusion.

5. The edge-light illuminating device according to claim 1, wherein the light source comprises a light-emitting diode.

6. A liquid crystal display device comprising the edge-light illuminating device according to claim 1.

* * * * *